(12) United States Patent
Osawa

(10) Patent No.: US 9,497,190 B2
(45) Date of Patent: Nov. 15, 2016

(54) INFORMATION PROCESSING APPARATUS, METHOD OF CONTROLLING THE SAME, STORAGE MEDIUM AND INFORMATION PROCESSING SYSTEM

(71) Applicant: CANON KABUSHIKI KAISHA, Tokyo (JP)

(72) Inventor: Takaharu Osawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 14/563,324

(22) Filed: Dec. 8, 2014

(65) Prior Publication Data
US 2015/0188914 A1    Jul. 2, 2015

(30) Foreign Application Priority Data
Dec. 26, 2013   (JP) ................................ 2013-270127

(51) Int. Cl.
 *H04L 9/32*    (2006.01)
 *H04L 29/06*   (2006.01)
 *H04L 29/08*   (2006.01)

(52) U.S. Cl.
 CPC ......... *H04L 63/0853* (2013.01); *H04L 63/083* (2013.01); *H04L 67/02* (2013.01); *H04L 63/168* (2013.01)

(58) Field of Classification Search
 CPC .............. H04L 63/08; H04L 63/083; H04L 63/0853; H04L 63/0861; H04L 63/0869; H04L 63/0876; H04L 63/10; G06F 21/30; G06F 21/31; G06F 21/32; G06F 21/34; G06F 21/44

USPC ............ 726/2–9, 27–30; 713/168–170, 713/192–193
See application file for complete search history.

(56) References Cited

U.S. PATENT DOCUMENTS

| | | | |
|---|---|---|---|
| 6,904,424 B1 * | 6/2005 | Gusler | G06F 9/45512 |
| 7,047,558 B1 * | 5/2006 | Mariana | H04L 29/06 725/6 |
| 7,143,025 B2 * | 11/2006 | Walsh | H04L 63/0807 703/21 |
| 8,375,423 B2 * | 2/2013 | Hays | G06F 21/51 709/229 |

(Continued)

FOREIGN PATENT DOCUMENTS

| | | |
|---|---|---|
| JP | 2003-345739 A | 12/2003 |
| JP | 2007-257500 A | 10/2007 |

(Continued)

OTHER PUBLICATIONS

Japanese office action issued in corresponding application No. 2013270127 on Nov. 16, 2015.

(Continued)

*Primary Examiner* — Hosuk Song
(74) *Attorney, Agent, or Firm* — Carter, DeLuca, Farrell & Schmidt, LLP

(57) ABSTRACT

An information processing apparatus holds a first script for acquiring authentication information stored in an external apparatus, and acquires authentication information as a result of causing the first script to execute in an execution step in a case where a second script is included in the received screen information, and displays an input screen in a state in which the authentication information acquired is set.

7 Claims, 14 Drawing Sheets

(56) References Cited

U.S. PATENT DOCUMENTS 8,695,027 B2* 4/2014 Schrecker ............. H04L 45/306
725/25
2008/0091856 A1* 4/2008 Blaisdell ............. H04L 41/0809
710/63

FOREIGN PATENT DOCUMENTS

| JP | 2012-185651 A | 9/2012 |
|---|---|---|
| JP | 2013-069240 A | 4/2013 |

OTHER PUBLICATIONS

Japanese office action issued in corresponding application No. 2013270127 on May 30, 2016.

* cited by examiner

```
javascript:(
function(){
var s=document.createElement("script");
s.src="https://formdataserver.xxx.yyy/js/loader.js";
document.body.appendChild(s);
}
)();
```
501

| URL | USER NAME | ELEMENT NAME | VALUE |
|---|---|---|---|
| http://www.serverA.xxx.yyy /service1/login.html | user1 | username | xxx |
| http://www.serverA.xxx.yyy /service1/login.html | user1 | password | yyy |
| http://www.serverB.xxx.yyy /service2/logon.html | user2 | email | zzz@zzz.com |
| http://www.serverB.xxx.yyy /service2/logon.html | user2 | pass | zzzzzzz |
| ... | | | |

FIG. 11

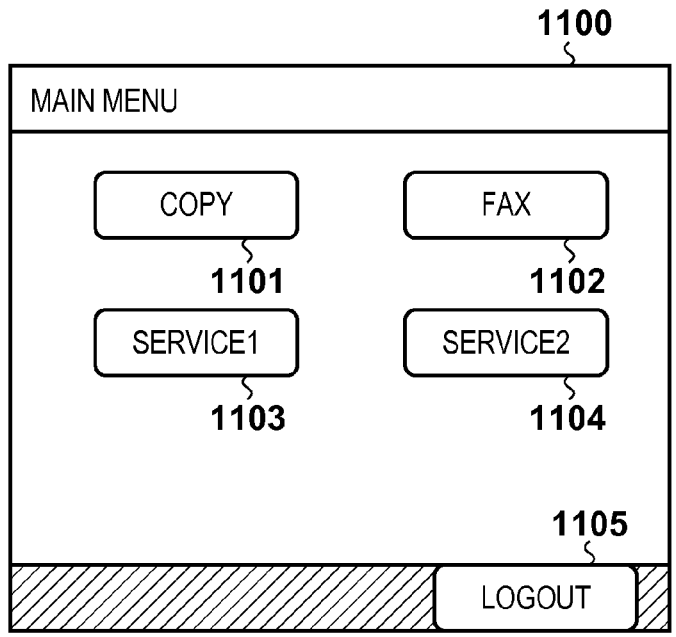

FIG. 12

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>                                                   1200
    <title>service1 login</title>
    <script type="text/javascript" charset="utf-8" src="AutoCompReq.js"></script>

</head>
<body>
    <form method="post" action="login.html">
        <p>enter user name and password</p>
        <div class="c1">
            <p>user name<input name="username" type="text" /></p>     ~1201
            <p>password<input name="password" type="password" /></p>  ~1202
        </div>
        <input type="submit" value="login" />   ~1203
    </form>
</body>
</html>
```

FIG. 13

WEB BROWSER - [SERVICE1 LOGIN] ~1301

ENTER USER NAME AND PASSWORD

USER NAME ~1302
PASSWORD ~1303

LOGIN 1304

FIG. 14

```
javascript:(
function(){
var s=document.createElement("script");
s.src="https://formdataserver.xxx.yyy/js/main.js"+"?
url=http%3A%2F%2Fwww.serverA.xxx.yyy%2F
service1%2Flogin.html&deviceuser=user1";
document.body.appendChild(s);
}
)();
```
1401

FIG. 15

```
function load(){  ~1501
  var xhr = new XMLHttpRequest;
  xhr.onload = function() {
    //set read in value to element        ~1502
    ...
  };
  xhr.open('POST',
'https://formdataserver.xxx.yyy/loadService/');  ~1503
  ...
  xhr.send('id=0123456789');
};

function save(){  ~1504
  var reqdata='';
  for(...){
    //set name of element and value to reqdata   ~1505
    ...
  }
  var xhr = new XMLHttpRequest;
  xhr.open('post',
'https://formdataserver.xxx.yyy/saveService/');  ~1506
  xhr.send('id=0123456789,'+reqdata);
}

(function(){  ~1507
  //add read in button
  var loadButton=document.createElement("input");
  loadButton.type="button";                              ~1508
  loadButton.onclick=function(){load()};
  ...
  document.body.appendChild(loadButton);

//add save button
  var saveButton=document.createElement("input");
  saveButton.type="button";                              ~1509
  saveButton.onclick=function(){save()};
  ...
  document.body.appendChild(saveButton);

//execute read in
  load();  ~1510
})();
```

FIG. 19

```
javascript:(
function(){
var s=document.createElement("script");
s.src="https://formdataserver.xxx.yyy/js/loader.js"+"?Reco
very=true";
document.body.appendChild(s);
}
)();
```
↘1901

FIG. 20

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
   <title>Service1 login error</title>
   <script type="text/javascript" charset="utf-8"
src="AutoCompRevocery.js"></script>
                                          ↘2001
</head>
<body>
   <form method="post" action="login.html">
      <p>re-enter user name and password</p>
      <div class="c1">
         <p>user name<input name="username" type="text" /></p>
         <p>password<input name="password" type="password" /></p>
      </div>
      <input type="submit" value="login" />
   </form>
</body>
</html>
```

INFORMATION PROCESSING APPARATUS, METHOD OF CONTROLLING THE SAME, STORAGE MEDIUM AND INFORMATION PROCESSING SYSTEM

BACKGROUND OF THE INVENTION

Field of the Invention

The present invention relates to an information processing apparatus, a method of controlling the same, and an information processing system having a Web browser that receives screen data from a Web server and displays a screen based on that screen data.

Description of the Related Art

An information processing apparatus, such as a PC, equipped with a Web browser, displaying a screen based on screen data (for example, HTML (HyperText Markup Language) data) provided from a Web server on a network is known. Amongst screens displayed on a Web browser of an information processing apparatus there are operation screens for operating a Web application that a Web server has.

In conventional Web applications, there are those that have a function for authenticating a user that uses the Web application. In a case where this kind of Web application is used, first, HTML data, including a form for inputting user information, is provided to a Web browser from the Web application. The Web browser displays a screen based on the received HTML data. When a user inputs user information such as a user name or a password via the displayed screen, the Web browser transmits form content (already input user information) to the Web application, and a user authentication is performed on the Web application side.

Japanese Patent Laid-Open No. 2007-257500 (patent document 1) and Japanese Patent Laid-Open No. 2012-185651 (patent document 2), for example, are known as techniques for reducing effort upon inputting of user information into a screen displayed on a Web browser. In patent document 1, it is recited that in a case of an environment in which a user uses a plurality of Web applications, a single sign-on is realized so as to store all of the different user information for each Web application. More specifically, in patent document 1, when, in a state in which a Web browser is displaying a screen of a Web application, a user selects a script held as a bookmark, and an access to an authentication apparatus is executed in accordance with a definition of the script. Then, under the condition that the user is authenticated by the access destination authentication apparatus, usage of the Web application is permitted. With this, the user need not store all the different user information for each Web application.

In patent document 2, when user information is input into a screen displayed on a Web browser, a script for acquiring user information that is stored in an external apparatus for a particular screen is executed. With this, the user is able to reduce the effort of inputting user information.

However, there are problems with the above described conventional techniques as recited below. For example, in a case where user information is input into a screen displayed on a Web browser for user authentication by a Web application, the user must input user information repeatedly every time he or she uses the Web application. Holding, within a Web browser distinguishably for each user, user information that users once inputted, and then automatically setting (auto-complete) the held user information within the screen when the screen is displayed on the Web browser is known.

However, in order to realize an auto-complete by a conventional approach it is necessary to hold information corresponding to all of the users within the Web browser, and there is a problem in that memory resources of the information processing apparatus are wasted. Also, in an environment in which the same user uses a plurality of information processing apparatuses, there is a problem in that a Web browser of each information processing apparatus is caused to hold the user's user information.

In patent document 1, it is necessary to input user information repeatedly each time the Web application is used. Also, because the user manually selects the script that is held as the bookmark, excessive effort is incurred. In patent document 2, a script for acquiring the user information for a particular page can be executed. However, with this approach, it is necessary to register in advance information of the page to which the user desires that the auto-complete be applied, and the effort of the user increases. Also, when all pages are registered as pages for which it is desired that autocomplete be applied in order to cut out effort, processing of executing the script occurs each time a page is displayed, and there is a problem in that this has an impact on overall system performance. Also, in a case where an unexpected screen transition occurs, such as one to an error screen displayed in a case where there is an error in the user information that the user inputs, there is a problem in that the auto-complete function cannot be provided.

SUMMARY OF THE INVENTION

The present invention enables realization of an arrangement that reduces effort by a user inputting information into a screen displayed on a Web browser, in addition to enabling a Web application to designate a page which is a target of reduction of information input effort by a user.

One aspect of the present invention provides an information processing apparatus having a Web browser being capable of receiving screen information provided by a Web server, and displaying an input screen for inputting authentication information based on the screen information, the apparatus comprising: an execution unit configured to execute a script; a holding unit configured to hold a first script for acquiring authentication information stored in an external apparatus; a control unit configured to cause the execution unit to execute the first script, which is held by the holding unit; a notification unit configured to, in a case where the received screen information includes a second script, cause the execution unit to execute the second script, and as an execution result of the second script, to make a notification to the control unit; an acquisition unit configured to acquire, as a result of the control unit, which received the notification by the notification unit, causing the execution unit to execute the first script, the authentication information; and a display unit configured to display, in a state in which the authentication information acquired by the acquisition unit is set, the input screen.

Another aspect of the present invention provides an information processing apparatus having a Web browser being capable of receiving screen information provided by a Web server, and displaying an input screen for inputting authentication information based on the screen information, the apparatus comprising: an execution unit configured to execute a script; a holding unit configured to hold a first script for acquiring authentication information stored in an external apparatus; an acquisition unit configured to, in a case where, in the received screen information, a second script is included, cause an execution unit to execute the first script, and as an execution result of the first script, to acquire the authentication information; and a display unit configured to display, in a state in which the authentication information acquired by the acquisition unit is set, the input screen.

Still another aspect of the present invention provides an information processing system including a Web server, and an information processing apparatus having a Web browser being capable of receiving screen information provided by the Web server, and displaying an input screen for inputting authentication information based on the screen information, wherein the Web server comprises a provision unit configured to provide screen information including a second script and screen information that does not include the second script to the information processing apparatus, and the information processing apparatus comprises: an execution unit configured to execute a script; a holding unit configured to hold a first script for acquiring authentication information stored in an external apparatus; a control unit configured to cause the execution unit to execute the first script, which is held by the holding unit; a notification unit configured to, in a case where the received screen information includes a second script, cause the execution unit to execute the second script, and as an execution result of the second script, to make a notification to the control unit; an acquisition unit configured to acquire, as a result of the control unit, which received the notification by the notification unit, causing the execution unit to execute the first script, the authentication information; and a display unit configured to display, in a state in which the authentication information acquired by the acquisition unit is set, the input screen.

Yet still another aspect of the present invention provides a method of controlling an information processing apparatus having a Web browser being capable of receiving screen information provided by a Web server, and displaying an input screen for inputting authentication information based on the screen information, the method comprising: executing a script; holding a first script for acquiring authentication information stored in an external apparatus; in a case where, in the received screen information, a second script is included, acquiring, as a result of causing an execution of the first script in the executing, the authentication information; and displaying, in a state in which the authentication information acquired in the acquiring is set, the input screen.

Still yet another aspect of the present invention provides a non-transitory computer-readable storage medium storing a program for causing a computer to function as the image processing apparatus.

Further features of the present invention will be apparent from the following description of exemplary embodiments with reference to the attached drawings.

BRIEF DESCRIPTION OF THE DRAWINGS

FIG. 11 is a view for showing a screen of the MFP 101 according to the first embodiment.

FIG. 12 is a view for illustrating an example of HTML data that a Web application 810 according to the first embodiment responds with.

FIG. 13 is a view for showing a screen of the MFP 101 according to the first embodiment.

FIG. 14 is a view for illustrating an example of a script that the Web browser monitoring module 407 according to the first embodiment instructs the Web browser 404 to load.

FIG. 15 is a view for illustrating an example of a script that a script response module 614 according to the first embodiment responds with.

FIG. 19 is a view for illustrating an example of a script that notifies the Web browser monitoring module 407 that the loading of the HTML data by the Web browser 404 according to the second embodiment has completed, and that the page is not a target page for storing the user information.

FIG. 20 is a view for illustrating an example of HTML data of a screen 1805 displayed in a case where the authentication error according to the second embodiment occurs.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Information Processing System

Figure 1:
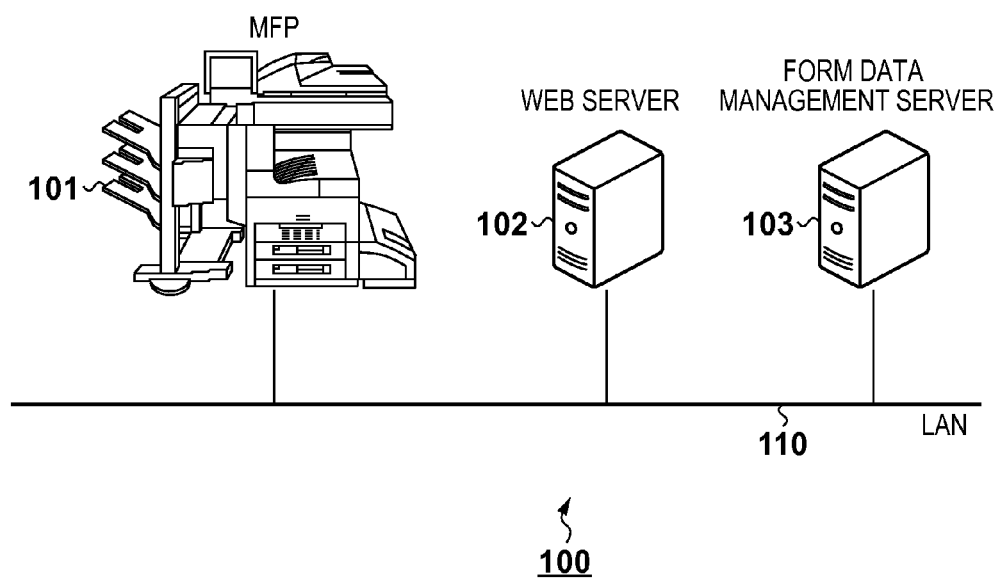
FIG. 1 is an overall view of an information processing system according to a first embodiment.

Firstly, with reference to FIG. 1, explanation will be given for an example configuration of an information processing system in the present embodiment. In an information processing system 100, an MFP (Multi Function Peripheral) 101, which is one example of an information processing apparatus, a Web server 102, and a form data management server 103, which is one example of an external apparatus, are included. The MFP 101, the Web server 102, and the form data management server 103 included in the information processing system 100 are connected communicatively with each other via a LAN (Local Area Network) 110. Note, apparatuses other than the previously described apparatuses may be connected on the LAN 110 (on a network), and a portion of the information processing system 100 may be configured. Also, a function of a form data management server may be embedded in the MFP 101.

<Information Processing Apparatus Configuration>

Figure 2:
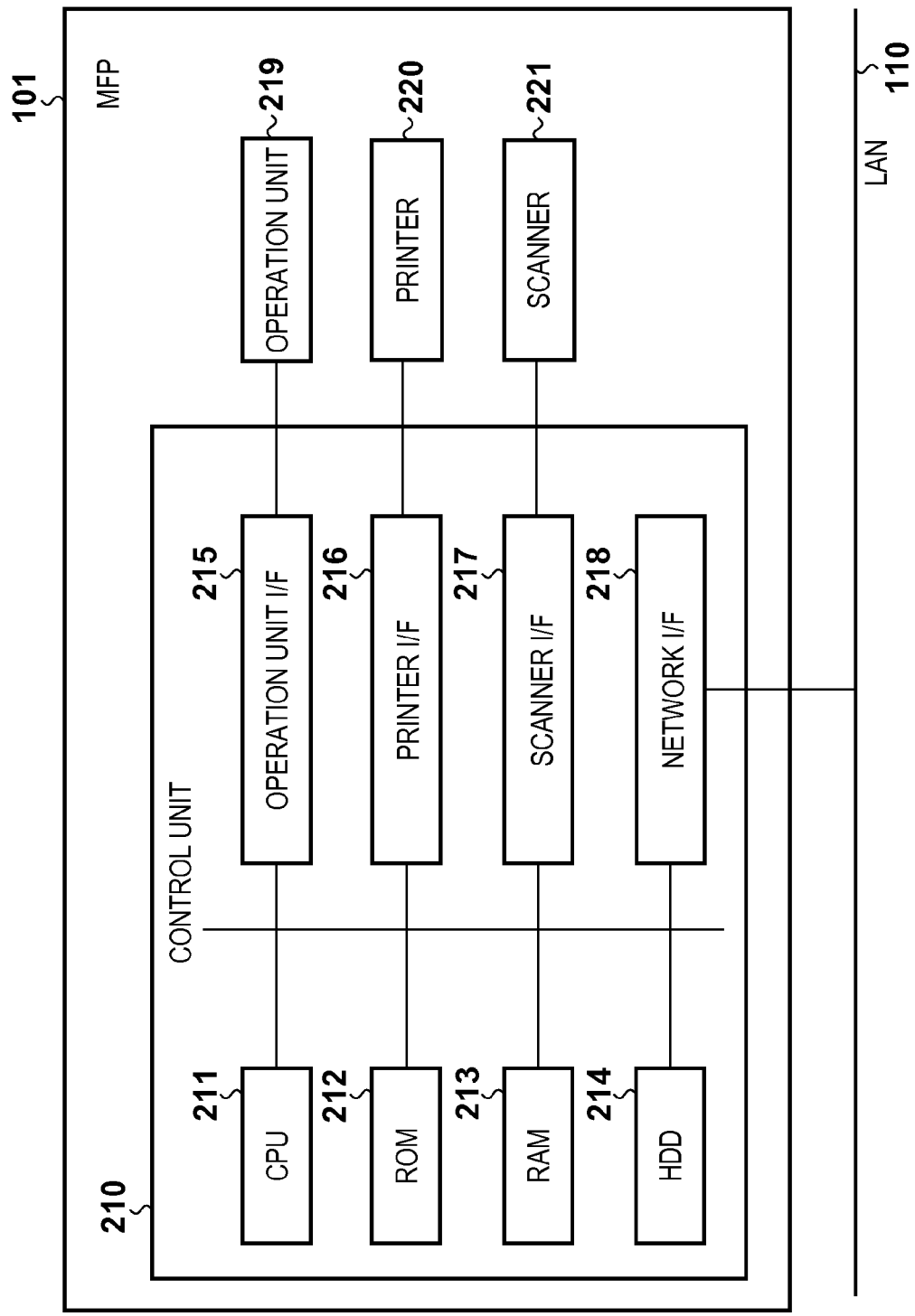
FIG. 2 is a block diagram for showing a configuration of an MFP 101 according to the first embodiment.

Next, with reference to FIG. 2, explanation will be given for an example configuration of the MFP 101, which is an information processing apparatus. The MFP 101 is provided with a control unit 210, an operation unit 219, a printer 220, and a scanner 221. The control unit 210 is equipped with a CPU 211, a ROM 212, a RAM 213, an HDD 214, an operation unit I/F 215, a printer I/F 216, a scanner I/F 217, and a network I/F 218.

The CPU 211 controls overall operation of the MFP 101. The CPU 211 reads out a control program stored in the ROM 212, and performs various control such as reading control, transmission control, or the like. Because of this, the MFP 101 is able to provide various services such as copying/scanning (transmission)/printing, or the like. The RAM 213 is used as a temporary storage area such as a main memory or a work area of the CPU 211. The HDD 214 stores image data and various programs.

The operation unit I/F 215 connects the operation unit 219 and the control unit 210. In the operation unit 219, a liquid crystal display unit having a touch panel function, a keyboard, or the like, are provided. The printer I/F 216 connects the printer 220 and the control unit 210. Image data to be printed by the printer 220 is transferred from the control unit 210 via the printer I/F 216, and printed on a recording medium in the printer 220. The scanner I/F 217 connects the scanner 221 and the control unit 210. The scanner 221 generates image data by reading an image on an original, and inputs the generated image data into the control unit 210 via the scanner I/F 217. The network I/F 218 connects the control unit 210 (the MFP 101) to the LAN 110. The network I/F 218 controls a communication between apparatuses on the LAN 110 (for example, the Web server 102, or the form data management server 103).

<Web Server>

Figure 3:
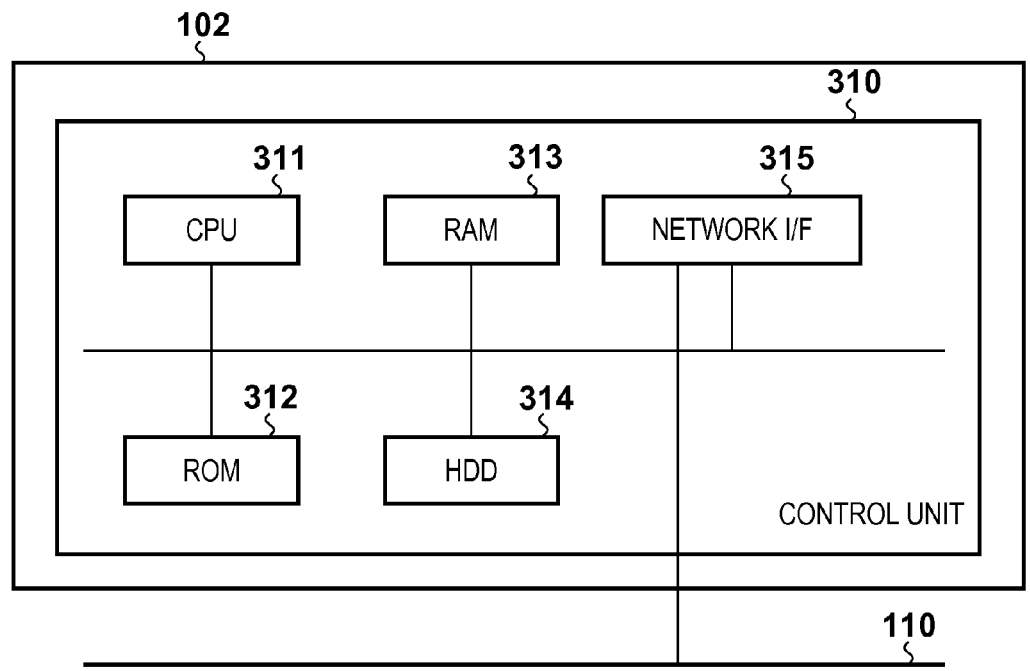
FIG. 3 is a block diagram for showing a configuration of a Web server 102 according to the first embodiment.

Next, with reference to FIG. 3, explanation will be given for an example configuration of the Web server 102. Note, the form data management server 103 and the Web server 102 have similar configurations. A control unit 310 is equipped with a CPU 311, a ROM 312, a RAM 313, an HDD 314, and a network I/F 315. The control unit 310 controls overall operation of the Web server 102. The CPU 311 reads out control programs stored in the ROM 312, and executes various control processing. The RAM 313 is used as a temporary storage area such as a main memory or a work area of the CPU 311. The HDD 314 stores image data and various programs. The network I/F 315 connects the control unit 310 (the Web server 102) to the LAN 110. The network I/F 315 transmits and receives various information with other apparatuses on the LAN 110.

<Information Processing Apparatus Software Configuration>

Figure 4:
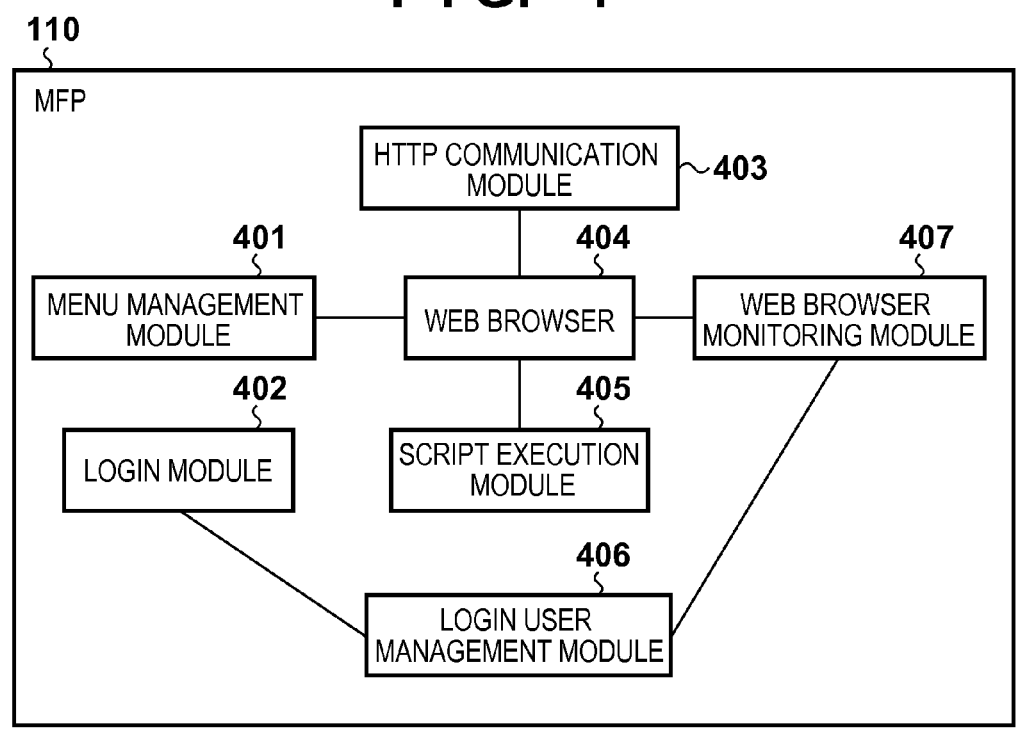
FIG. 4 is a view for illustrating a software configuration of the MFP 101 according to the first embodiment.

Next, with reference to FIG. 4, explanation will be given for a software configuration of the MFP 101. Each functional unit shown in FIG. 4 is realized by the CPU 211 of the MFP 101 executing a program stored in the HDD 214 of the MFP 101. Note, in the MFP 101 various functional units are provided other than the functional units shown graphically. Also, the present invention is not limited to this, and the software configuration explained below may be realized by a hardware configuration, or a combination of a hardware configuration and a software configuration.

The MFP 101 is equipped with a menu management module 401, a login module 402, an HTTP communication module 403, a Web browser 404, a script execution module 405, a login user management module 406, and a Web browser monitoring module 407 as its software configuration. The menu management module 401 is a functional unit for displaying a menu screen for activating various software modules (functional units) of the MFP 101. GUI (Graphical User Interface) buttons for instructing the display of a copy screen, screens of a later explained Web browser, or the like, are displayed in a list. Also, in accordance with a button being operated (for example, pressed) by a user, a corresponding software module (functional unit) is activated.

The login module 402 performs a user authentication in order to identify the user operating the MFP 101 by receiving an input of user information from the user upon initiation of usage of the MFP 101. Note, the inputting of the user information here is received on a screen displayed on the operation unit 219 based on screen data held within the MFP 101 rather than a screen of the later explained Web browser. Also, an approach of a user inputting by typing on a software keyboard displayed on the operation unit 219 or an approach of inputting by a reading out of user information stored in an IC card may be used as a user information input approach. Also, verification of the user information is assumed to be performed by the login module 402, but configuration may be taken such that a management server for managing a database of user information is arranged separately externally, and the verification of the user information is performed on the management server side. The login module 402, in a case where the user authentication succeeds, permits the usage of the MFP 101 by the user.

The HTTP (HyperText Transfer Protocol) communication module 403 executes communication in accordance with HTTP by controlling the network I/F 218. The Web browser 404 performs communication with the Web server 102 via the HTTP communication module 403. The Web browser 404 uses a URL (Uniform Resource Locator) designated by a user via the operation unit 219, and requests HTML data corresponding to the URL of a Web application equipped in the Web server 102. Also, the Web browser 404 receives HTML data (screen information) transmitted from the Web application as a response to the request, and displays a screen based on the received HTML data on the operation unit 219.

The script execution module 405 interprets a script (for example, Java (registered trademark) Script) that the Web browser 404 read in, operates content displayed on the Web browser 404, and executes communication by the HTTP communication module 403. The login user management module 406 manages user information such as a user name or a mail address of a user logged into the MFP 101 (the user authenticated by the login module 402). Also, the login user management module 406 manages the functions of the MFP 101 that the user authenticated by the login module 402 can use, and is capable of determining availability of each function (whether or not it is executable) in accordance with the authenticated user. In the present embodiment, in the login user management module 406, for each authenticated user, availability of an auto-complete function (auto-complete processing) of the later explained Web browser is determined. Here, the auto-complete function is a function of displaying in a state in which data defined beforehand is reflected in a particular form in a screen. For example, by displaying in a state in which the user name and the password are input in accordance with the user that is currently using the MFP 101 on the authentication screen, it is possible to skip user input relating to the user name and the password.

Figures 5, 6:
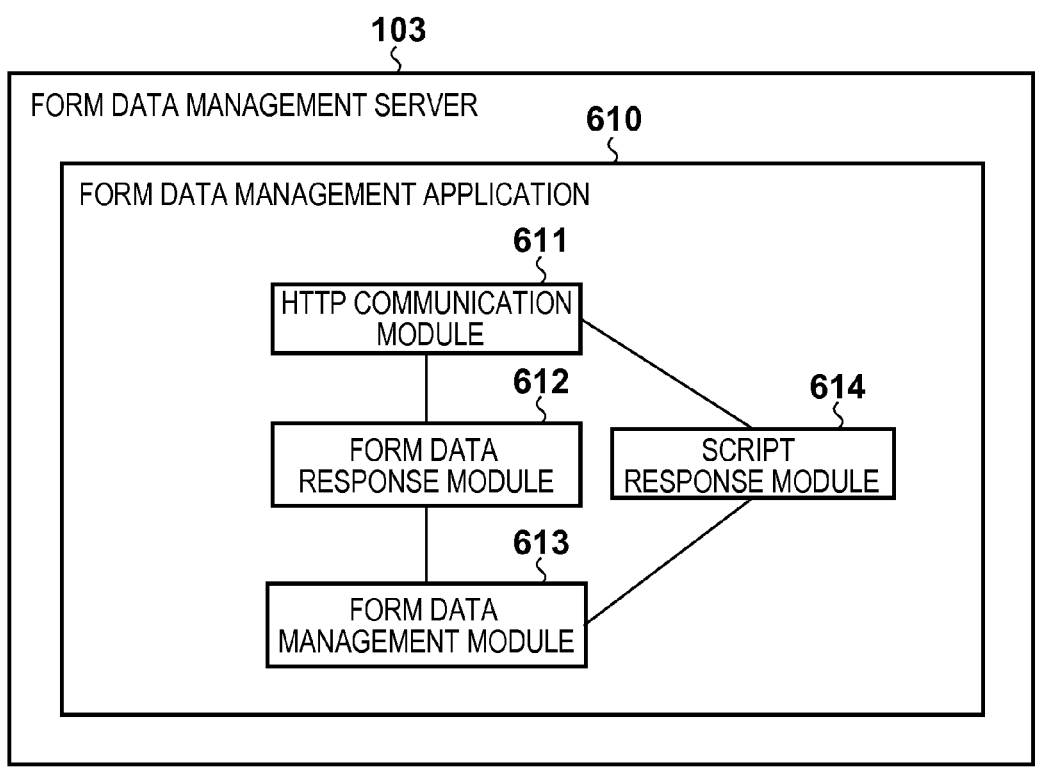
FIG. 5 is a view for illustrating an example of a script that notifies a Web browser monitoring module 407 that loading of HTML data by a Web browser 404 completed according to the first embodiment.
FIG. 6 is a view for illustrating a software configuration of a form data management server 103 according to the first embodiment.

The Web browser monitoring module 407 monitors the operation of the Web browser 404. Specifically, the Web browser monitoring module 407 determines whether or not the loading of HTML data by the Web browser 404 has completed or whether or not the display of a screen has completed. Also, the Web browser monitoring module 407 holds a script which is later explained in FIG. 14 in advance, and instructs the loading of the script to the Web browser 404 automatically in accordance with the operation of the Web browser 404. Note, in this embodiment, a script that is explained later using FIG. 5 is executed, and it is assumed that in a case where the Web browser monitoring module 407 is notified that the HTML data has completed, the loading of the script is instructed. FIG. 5 is an example of a script (a first script) for notifying, from the Web browser 404, the Web browser monitoring module 407 that the loading of the HTML data has completed. The script (Java Script) shown in FIG. 5 defines that the Web browser monitoring module 407 is notified. As a result a later explained Web application 810 is able cause the Web browser monitoring module 407 to be notified of an HTML data loading completion by embedding the script in the HTML data transmitted in response to a request from the Web browser 404. In other words, the Web application 810 is able to control so that the auto-complete function is executed as necessary by embedding the script in HTML data, for example. In this way, the script is something by which a processing procedure, which the script execution module 405 performs in the present embodiment, is defined.

<Form Data Management Server Software Configuration>

Next, with reference to FIG. 6, explanation will be given for a software configuration of the form data management server 103. Each functional unit shown in FIG. 6 is realized by the CPU 311 of the form data management server 103 executing a program stored in the HDD 314 of the form data management server 103. Note, in the form data management server 103, various functional units other than the functional units shown graphically are provided. It is assumed that it is possible to access the form data management server 103 by using the domain name "formdataserver.xxx.yyy".

A form data management application 610 is provided with an HTTP communication module 611, a form data response module 612, a form data management module 613, and a script response module 614. The form data management application 610 performs a response of form data or a script in accordance with a request from an apparatus on the LAN 110. The form data will be explained later using FIG. 7. The HTTP communication module 611 receives an HTTP request via the LAN 110, and as an HTTP response transmits information received from the form data response module 612 or the script response module 614 to the apparatus that transmitted the HTTP request.

The form data response module 612 performs processing relating to form data in accordance with a request from an external unit received via the HTTP communication module 611. Specifically, in a case where the URL "https://formdataserver.xxx.yyy/loadService" is accessed, the form data response module 612 responds with form data stored in a later explained form data management table. Also, in a case where the URL "https://formdataserver.xxx.yyy/saveService" is accessed, form data is newly saved in the form data management table.

The script response module 614 responds with a script in accordance with a request from an external unit received via the HTTP communication module 611. More specifically, in a case where the URL "https://formdataserver.xxx.yyy/js/main.js" is accessed, the script response module 614 responds with a script held in advance.

<Form Data Management Table>

Next, with reference to FIG. 7, explanation will be given for a form data management table 700 that the form data management module 613 holds. In the form data management table 700 a plurality of form data items are defined. In a column 701, URLs that the Web browser 404 of the MFP 101 uses in order to receive HTML data are stored. Form data is managed by distinguishing for each the Web application that the Web browser 404 of the MFP 101 accesses based on the URL.

In a column 702, user names of users that log into the MFP 101 are stored. These users are authenticated by the login module 402. Form data is managed by distinguishing the user operating the MFP 101 based on the user name. In a column 703, element names of a form included in HTML data that the Web browser 404 of the MFP 101 receives are stored. Form data is managed by distinguishing for each type of form included in the HTML data that the Web browser 404 of the MFP 101 receives based on the element name. Here, the form, in the present embodiment, indicates an input form by which user input is possible which is included in a screen that the Web browser 404 displays based on HTML data. For example, this corresponds to a text box control 1302 for inputting a user name and a password control 1303 for inputting a password in FIG. 13, which will be explained later. In a column 704, values to be input into a form included in HTML data that the Web browser 404 of the MFP 101 receives are stored.

Figures 7, 8:
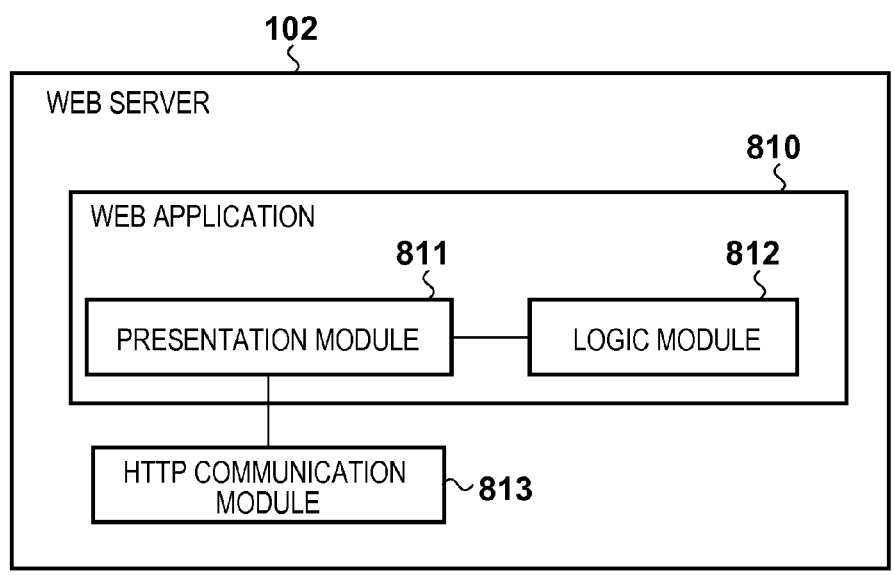
FIG. 7 is a view for illustrating a form data management table according to the first embodiment.
FIG. 8 is a view for showing a software configuration of the Web server 102 according to the first embodiment.

In FIG. 7, explanation is given with an example of a case in which a user logs into the MFP 101 under the user name of "user1", using the URL "http://www.serverA.xxx.yyy/service1/login.html", and HTML data is received. In such a case, the element name "username" and the value "xxx" stored in the record of the first line, and the element name "password" stored in the record of the second line and the value "yyy" are sent in the response to the Web browser 404. Accordingly, the Web browser 404 displays on the operation unit 219 the screen in accordance with the HTML data in a state in which the value "xxx" is set in the form with the element name "username" which is included in the HTML data. Also, the Web browser 404 displays on the operation unit 219 the screen in accordance with the HTML data in a state in which the value "yyy" is set in the form with the element name "password" which is included in the HTML data. By this processing sequence, it is possible to realize an auto-complete function, and the effort of the user of the MFP 101 manually inputting the values "xxx" and "yyy" can be eliminated.

<Web Server Software Configuration>

Next, with reference to FIG. 8, explanation will be given for a software configuration of the Web server 102. Each functional unit shown in FIG. 8 is realized by the CPU 311 of the Web server 102 executing a program stored in the HDD 314 of the Web server 102. The Web server 102 is provided with a Web application 810 and an HTTP communication module 813. The Web application 810 is equipped with a presentation module 811 and a logic module 812.

The Web application 810, as a response to a request from the Web browser 404 of the MFP 101, transmits, to the MFP 101, HTML data for displaying a user information input screen that receives input of user information used to authenticate the user. In this HTML data is included the above described form information. Accordingly, the Web application 810 is able to control whether or not to apply the auto-complete function by designating a particular URL (particular screen information) defined in the column 701 of FIG. 7. Also, as described above, the Web application 810 is able to embed a script that notifies the Web browser monitoring module 407 that the loading of the HTML data from the Web browser 404 has completed (a first script) in the HTML data. With this, the Web application 810 is able to control whether or not to apply the auto-complete function. Additionally, the Web application 810 transmits HTML data for displaying a screen for receiving an instruction of a user toward the MFP 101, and an execution instruction for image processing for the MFP 101.

The presentation module 811, via the HTTP communication module 813, provides HTML data to the Web browser 404 of the MFP 101. Also, the presentation module 811, via the HTTP communication module 813, receives form data transmitted from the Web browser 404. The logic module 812 performs processing related to form data received via the presentation module 811. In this embodiment, processing is performed relating to user information (that which a user manually inputted on a screen displayed on the Web browser 404, or that which was inputted using the auto-complete function) which is transmitted from the Web browser 404 as form data. This processing is processing for performing a verification against user information managed in a database in advance, for example, and permitting usage of the Web application 810 in a case where a match exists. In a case where the usage of the Web application 810 is permitted, HTML data for displaying an operation screen of the Web application 810 is sent in reply to the Web browser 404.

<Monitoring Processing>

Figure 9:
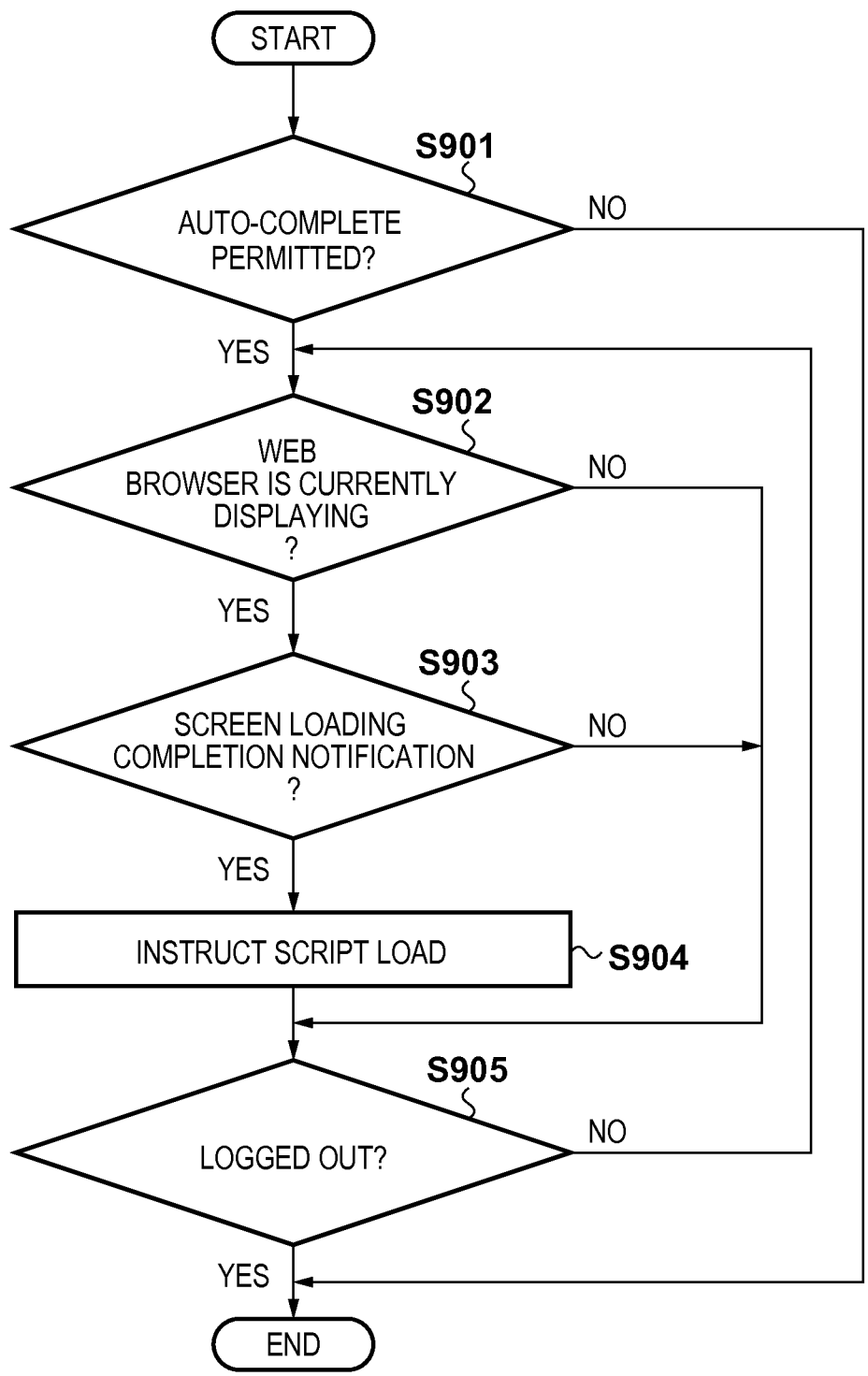
FIG. 9 is a flowchart for describing operation of the Web browser monitoring module 407 according to the first embodiment.

Next, with reference to FIG. 9, explanation will be given for processing in the MFP 101 in which the Web browser monitoring module 407 monitors for an HTML data loading completion in the Web browser 404, and makes an instruction to the Web browser 404 to load a script. The flowchart of FIG. 9 is executed when the user authentication by the login module 402 succeeds, and the user starts to use the MFP 101. Note, each operation (step) shown in the flowchart of FIG. 9 is realized by the CPU 211 of the MFP 101 executing a control program stored in the HDD 214.

In step S901, the CPU 211 determines whether or not the user currently using the MFP 101 is a user for which usage of the auto-complete function is permitted by making a query toward the login user management module 406. Here, the login user management module 406 manages information indicating whether or not usage of the auto-complete function is permitted for each user, and, for example, makes the determination by searching the information managed using the user ID received from the CPU 211. In a case where the result of this determination is that the user is permitted to use the auto-complete function, the processing proceeds to step S902, and if the user is not permitted to use the auto-complete function, the processing ends.

In step S902, the CPU 211 determines whether or not the Web browser 404 is currently displaying to the operation unit 219. This determination may be determined based on whether or not the Web browser 404 is currently activated, and may be determined based on whether or not the Web browser 404 is displayed on the foreground of the operation unit 219. In a case where the result of this determination is that the Web browser 404 is currently displaying, the processing proceeds to step S903, and if the Web browser 404 is not currently displaying, the processing proceeds to step S906.

In step S903, the CPU 211 determines whether or not there is an HTML data loading completion notification by the Web browser 404. In a case where the result of this determination is that the loading of the HTML data has completed, the processing proceeds to step S904, and if the loading of the HTML data has not completed, the processing proceeds to step S905.

In step S904, the CPU 211 makes an instruction to the Web browser 404 to load a script held within the Web browser monitoring module 407 in order to perform a later explained auto-complete function, and the processing proceeds to step S905. In step S905, the CPU 211 determines whether or not the user logged out of the MFP 101. In a case where the user logged out, the processing ends, and in a case where the user is not logged out, the processing returns to step S902.

<Auto-Complete Function>

Next, with reference to FIG. 10, explanation will be given for the auto-complete function in the present embodiment. When a user (it is assumed that is user has a user name of "user1" and that the auto-complete is permitted for the user) logs into the MFP 101, first, a menu screen is displayed to the operation unit 219 by the menu management module 401. FIG. 11 illustrates a menu screen 1100 displayed by the menu management module 401. In the menu screen 1100, a GUI button 1101 for making an instruction for usage of a copy application and a GUI button 1102 for making an instruction for usage of a fax application are displayed. Note, the copy application and the fax application are applications arranged within the MFP 101, and the Web browser 404 is not used when these applications are used. However, it is possible that these applications operate as a Web application that the Web server 102 provides.

GUI buttons 1103 and 1104 are GUI buttons for making an instruction for usage of Web applications equipped in the Web server 102 on the LAN 110, respectively. A GUI button 1105 is a GUI button for allowing the user to log out from the Web application. The GUI buttons 1103 and 1104 are each assigned to different URLs. Here, it is assumed that for the GUI button 1103 a URL corresponding to the Web application 810 is associated.

Figure 10:
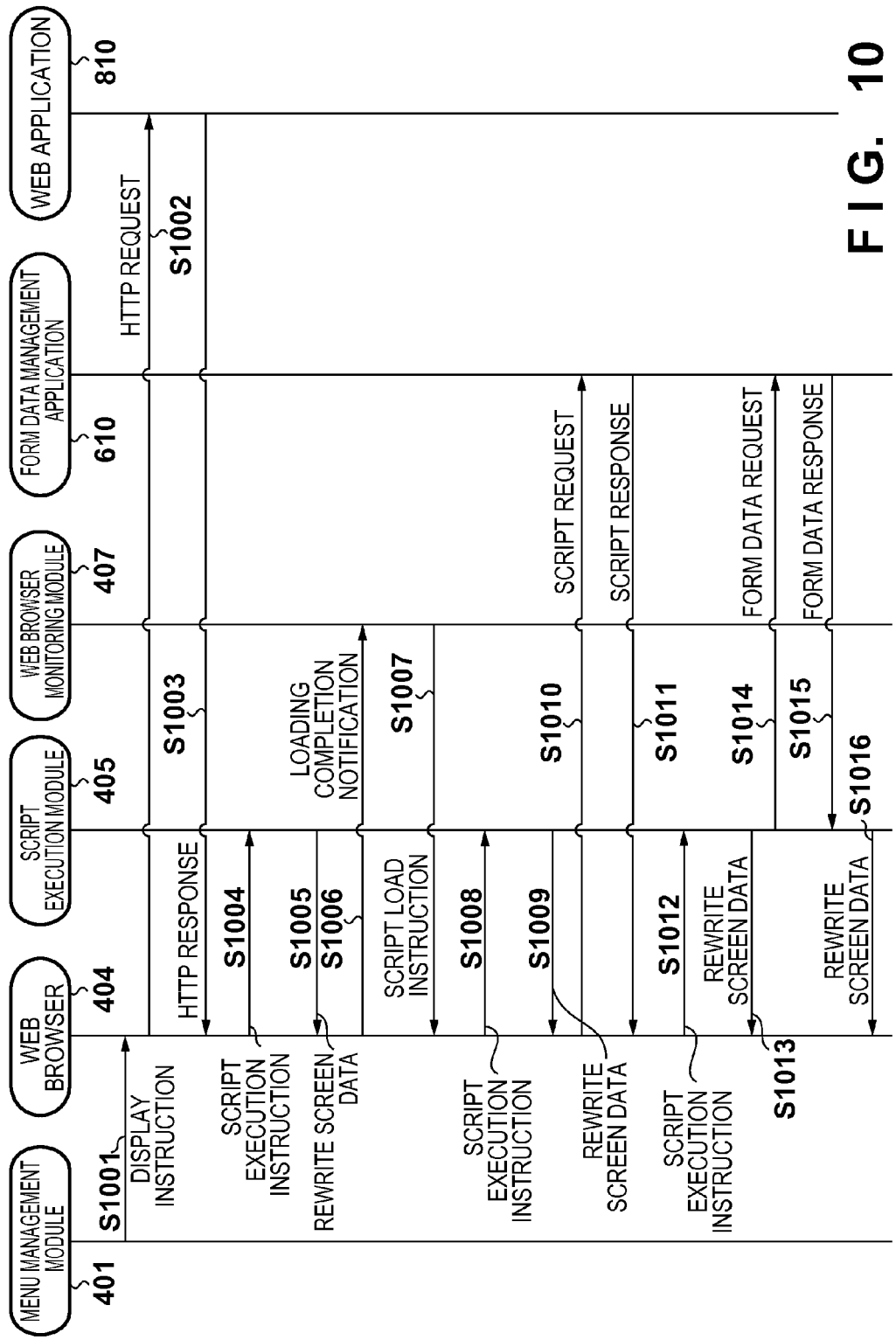
FIG. 10 is a sequence diagram for explaining overall operation of the information processing system according to the first embodiment.

When the GUI button 1103 is pressed (operated), the menu management module 401, in step S1001 of FIG. 10, controls so as to cause the Web browser 404 to activate and to display the Web browser 404 on the foreground of the operation unit 219. Also, using the URL assigned to the GUI button 1103, instruction is made to the Web browser 404 so as to perform a request of HTML data corresponding to the Web application 810.

In step S1002, the Web browser 404 makes a request to the Web application 810 for HTML data in accordance with the instruction from the menu management module 401. In step S1003, the Web application 810 responds (transmits) to the Web browser 404 with HTML data for displaying a user information input screen that receives input of user information used for authenticating the user.

In FIG. 12 HTML data that the Web application 810 sends in response in step S1003 is illustrated. Note, the screen data of the present embodiment is described in an HTML format, but settings of a style sheet are omitted in order to simplify the explanation.

A script tag 1200 is a script, shown in FIG. 5, that notifies the Web browser monitoring module 407 that the loading of the HTML data by the Web browser 404 has completed. An input tag 1201 is an element for inputting a user name. An input tag 1202 is an element for inputting a password. An input tag 1203 is an element for submitting information input into the form (user information here).

When the Web browser 404 loads the HTML data from the Web application 810 and the display of the screen has completed, the Web browser 404, in step S1004, makes an instruction to the script execution module 405 for execution of the script recited in the script tag 1200. As a result of the script executing, the script execution module 405, in step S1005, adds reference numeral 501 shown in FIG. 5 to the HTML data that the Web browser 404 loaded, and rewrites the screen data. In step S1006, the Web browser 404 notifies the Web browser monitoring module 407 of the loading completion.

FIG. 13 shows a screen displayed on the Web browser 404 based on the HTML data shown in FIG. 12. In a GUI screen 1301, the text box control 1302 for inputting a user name is displayed based on the input tag 1201. Also, a password control 1303 for inputting a password is displayed based on the input tag 1202. Also, a GUI button 1304 for logging in using the user name inputted into the text box control 1302 and the password inputted into the password control 1303 is displayed based on the input tag 1203.

In step S1007, the Web browser monitoring module 407 makes an instruction to the Web browser 404 to load the script. This processing is processing corresponding to the processing of step S904 of FIG. 9.

FIG. 14 is an example of a script that the Web browser monitoring module 407 instructs the Web browser 404 to load. Regarding FIG. 14, new lines are provided to simplify the explanation, but in reality is the character sequence has no new lines or spaces. The script shown in FIG. 14 defines that a URL of reference numeral 1401 be added to the HTML data as an external script (rewriting of screen data). The URL of reference numeral 1401 combines as a query, onto a "URL of the script response module 614", a "URL used to receive HTML data that the Web browser 404 currently has loaded" and "the user name of the user that is currently logged into the MFP 101".

"the URL of the script response module 614" is information that the Web browser monitoring module 407 holds in advance. The "URL used to receive HTML data that the Web browser 404 currently has loaded" and "the user name of the user that is currently logged into the MFP 101" are information that are automatically determined in accordance with the state of the MFP 101. Note, it is advantageous that a definition be added to the script shown in FIG. 14 that the same script is not loaded for the same HTML data two times or more.

In step S1008, the Web browser 404 makes an instruction to the script execution module 405 to execute the script, the loading of which the Web browser monitoring module 407 instructed. In accordance with this instruction, the script execution module 405 executes the script of FIG. 14.

In the script of FIG. 14, as described above, the rewriting of the HTML data is defined. Accordingly, when the script execution module 405 executes the script, reference numeral 1401 is added, in step S1009, to the HTML data that the Web browser 404 loaded, and the screen data is rewritten.

In step S1010, the Web browser 404, in accordance with the adding of a script tag in step S1009, makes a request of the form data management application 610 for a script (a second script). In this request, as shown in reference numeral 1401, information indicating the "URL used to receive HTML data that the Web browser 404 currently has loaded" and information indicating the "user name of the user that is currently logged into the MFP 101" and are included.

In step S1011, the script response module 614 of the form data management application 610 responds to the Web browser 404 with the script. Here, the script response module 614 accesses the form data management table that the form data management module 613 holds, and determines which line corresponds to the "URL" and the "user name" included in the query character sequence. For example, this is the information of the column 701 and the column 702 shown in FIG. 7.

The script response module 614 causes the form data management module 613 to issue an ID for accessing the determined row. Here, it is assumed that "0123456789" is issued as the ID. By using this ID it becomes possible to acquire the form data included in the form data management table 700, but in a case where an access of the form data management table 700 is not made for greater than or equal to a predetermined interval, the ID is disabled.

FIG. 15 is an example of a script that the script response module 614 sends in response. Reference numeral 1501 denotes a function for making a request to the form data management application 610 for form data for the auto-complete, and setting a value in an element included in the HTML data loaded in the Web browser 404.

Reference numeral 1502 denotes a script for setting a value in an element included in the HTML data that the Web browser 404 loaded in the form data acquired from the form data management application 610. Reference numeral 1503 denotes a script for making a request for form data to a form data acquisition service of the form data response module 612 indicated by the URL "https://formdataserver.xxx.yyy/loadService". In this request the ID "0123456789" that the form data management module 613 issued in advance is included.

Reference numeral 1504 denotes a function causing the form data that the user inputted via the screen displayed by the Web browser 404 (the user information here) to be saved by transmitting it to the form data management application 610. Reference numeral 1505 denotes a script for reading element names and values from the form included in the HTML data and setting a variable called "reqdata". Reference numeral 1506 denotes a script for requesting the saving of the previously described "reqdata" for a form data saving service of the form data response module 612 indicated by the URL "https://formdataserver.xxx.yyy/saveService". In this request the ID "0123456789" that the form data management module 613 issued in advance is included.

Reference numeral 1507 denotes a function that is automatically executed when the script of FIG. 15 is read in. Reference numeral 1508 denotes a script that adds a display object (a button) for calling the function of reference numeral 1501 to the HTML data that the Web browser 404 has loaded. Reference numeral 1509 denotes a script that adds a display object (a button) for calling the function of reference numeral 1504 to the HTML data that the Web browser 404 has loaded. Reference numeral 1510 denotes a script for calling the function of reference numeral 1501.

In step S1012, the Web browser 404 makes an instruction to the script execution module 405 to execute the script sent in response from the form data management application 610. In accordance with this instruction, the script execution module 405 executes the script of FIG. 15. In step S1013, the script execution module 405 executes the scripts of reference numerals 1508 and 1509, and adds the data for displaying the GUI buttons to the HTML data that the Web browser 404 has loaded. Continuing on, by the script execution module 405 executing the script of reference numeral 1510, the function of reference numeral 1501 is called, and the script of reference numeral 1503 is executed.

In step S1014, the script execution module 405 makes a request for form data to the form data management application 610 as a result of the executed script of reference numeral 1503. The form data management application 610, having received this request, sends in response form data corresponding to the ID included in the request out of the form data included in the form data management table 700 in step S1015 by the form data response module 612.

In the case of FIG. 7, the values "http://www.server-A.xxx.yyy/service1/login.html" and "user1" are sent in the response for the element names that match the two keys. More specifically, the information "xxx" is sent in the response for "username" and "yyy" is sent in the response for "password". The script execution module 405 executes the script 1502 after the response is received from the form data management application 610 in step S1015. In step S1016, as a result of executing the script 1502, the HTML data is rewritten so as to set the form data acquired from the form data management application 610 in the HTML data that the Web browser 404 loaded.

Figure 16:
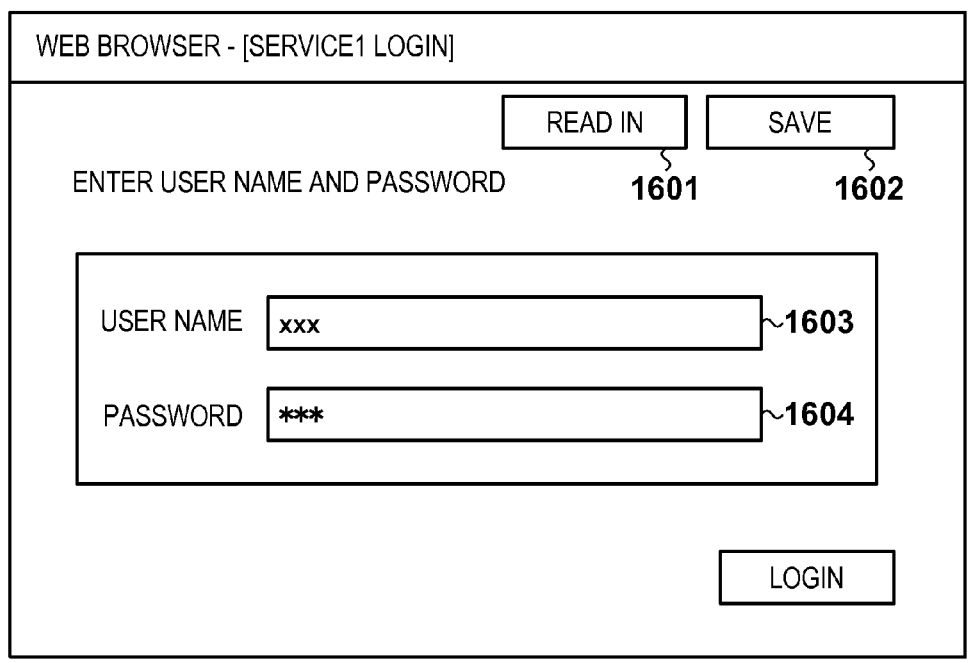
FIG. 16 is a view for showing a screen of the MFP 101 according to the first embodiment.

FIG. 16 shows a screen displayed on the Web browser 404 as a result of the processing of step S1013 and step S1015 being performed. A GUI button 1601 and a GUI button 1602 are display objects added by rewriting the HTML data in step S1013. Also, as a result of the processing of step S1015, as shown in reference numeral 1603 and 1604, the user name "xxx" and the password "yyy" are input in an auto-complete (pre-set) into the text box control 1302 and the password control 1303. Note, in the reference numeral 1604, the value of "yyy" is actually set, but on the screen "***" is displayed because the content is for a password.

When, from the state in which the auto-complete of the user information was performed as in FIG. 16, a user mistakenly modifies the content of reference numeral 1603 and 1604, the user can cause the processing for the auto-complete to execute once again by pressing the GUI button 1601. When the GUI button 1601 is pressed by the user, the Web browser 404 calls the script execution module 405, and the script of reference numeral 1501 is executed.

<Form Data Storage Processing>

Figure 17:
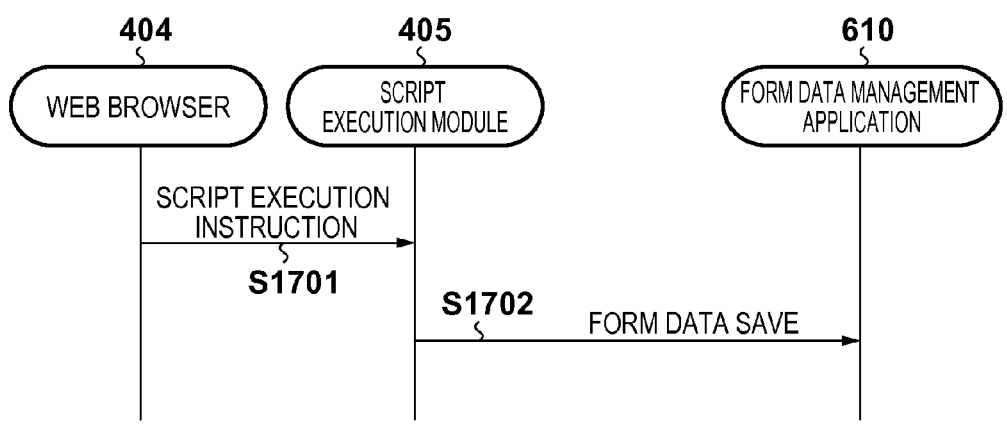
FIG. 17 is a view for illustrating a form data storage processing sequence according to the first embodiment.

Next, with reference to FIG. 17, explanation will be given for processing for newly saving to the form data management application 610 user information that the user inputted manually into a screen displayed by the Web browser 404 for login processing performed from the next time. In other words, in this storage processing, in a case where new user information is input, saves the user information to execute the auto-complete function upon the next time login processing is performed. A sequence shown in FIG. 17 is started when the user presses the GUI button 1602 after inputting the information manually in a state in which the screen shown in FIG. 16 is displayed by the Web browser 404.

In step S1701, the Web browser 404 makes an instruction to the script execution module 405 to execute the script shown in reference numeral 1504 of FIG. 5. In step S1702, the script execution module 405 executes the script of reference numeral 1504, and as a result, the saving of form data is requested of the form data management application 610. In this request the element names and values of the form, and also the ID issued in advance are included. On the form data management application 610 side, in accordance with the request from the script execution module 405, content of the form data management table 700 is updated.

As explained above, by virtue of the present embodiment, when reception (and screen display) of HTML data is performed using a particular URL, an auto-complete is performed with form data that is managed in the form data management application 610 which is external to the MFP 101. With this, the effort of the user inputting the user information, for which input into the user information input screen is required, for logging into the Web application 810, for example, can be eliminated. Also, in a case where new user information is input, the form data management application 610 is notified of that information, and it is possible to update the information. In this way, by virtue of the present embodiment, it is not necessary to manage the information relating to the auto-complete on a client apparatus such as the MFP 101, and rather this information can be managed on the form data management server 103, which is a server apparatus. Accordingly, the client apparatus in this system, by using the Web server 102 and the form data management server 103, can realize the auto-complete function without holding information for each user itself. Also, by virtue of the present embodiment, as explained above, the Web application 810 can designate a page which is a target of reduction of effort of information inputting by the user. Accordingly, it is possible to easily perform maintenance on an auto-complete function by performing maintenance on the Web server 102 without having to perform maintenance on all of the client apparatuses in the information processing system. Note, the present invention can be applied to a server that integrates the Web server 102 and the form data management server 103.

Note, explanation was given for an example in which the auto-complete was performed for user information used in a user authentication, but the information that is the subject of the auto-complete is not limited to this, and for example, a search keyword or a fixed greeting may be the subject. Also, the subject of the auto-complete is not limited to only keywords, and it is possible to apply the auto-complete to the input of checks for check-boxes or selections from pull-downs.

Also, in step S1010, step S1011, step S1014, and step S1015 of FIG. 10, the script execution module 405 and the Web browser 404 communicate with the form data management application 610, but configuration may be taken such that the Web browser monitoring module 407 mediates this. In such a case, there is the advantage that configuration may be taken such that the form data management application 610 side supports a communication protocol other than HTTP.

Also, explanation was given for an example in which the Web browser monitoring module 407 holds the script shown in FIG. 14, but configuration may be taken such that instead the Web browser 404 holds a bookmark. In such a case, in the script loading instruction in step S1005 of FIG. 10, the Web browser monitoring module 407 designates a bookmark ID, and the Web browser 404 loads bookmark information (the script of FIG. 14) corresponding to the designated bookmark ID.

Second Embodiment

Below, explanation will be given for a second embodiment with reference to FIG. 18 through FIG. 21. In the above described first embodiment, the Web application 810 realizes associating and storing of information such as the user name, for a URL of a page designated as a page that is a target of reduction of effort of information input by a user. In a case, hypothetically, where the page is a page for performing a user authentication, there are cases in which there will be an authentication error when a user inputs erroneous information. Here, a configuration in which a screen for information input is performed by the user is once again caused to be displayed on an error screen and the authentication is performed again may be taken. In such a case, the URL, which is stored along with the information input by the user, should be that of the original page for performing the user authentication rather than that of the error screen. In this embodiment, explanation will be given for an embodiment in which the information inputted by the user is stored in association with the URL of the original user authentication page rather than the error screen.

Figure 18:
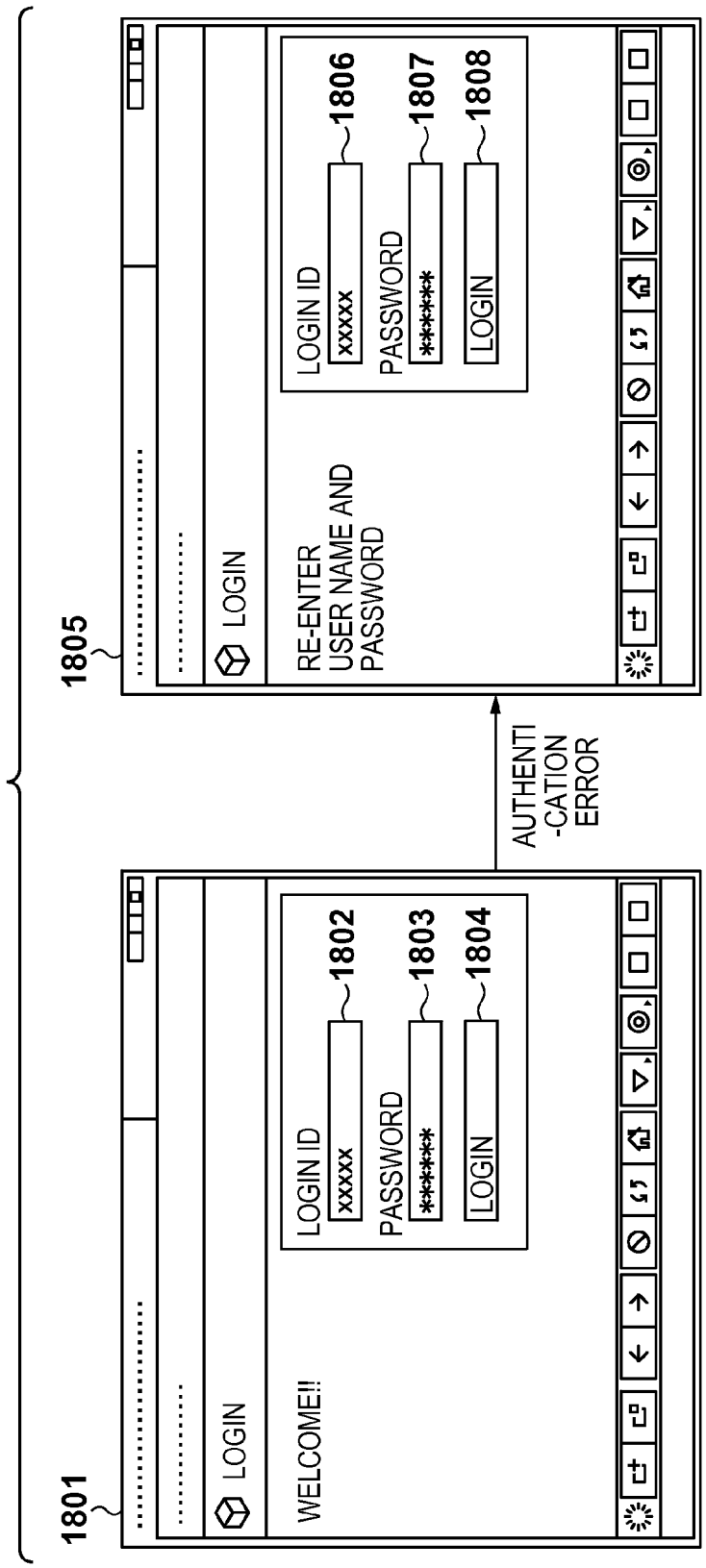
FIG. 18 is a view for showing a screen transition for performance of information input by a user once again in a case where an authentication error according to a second embodiment occurs.

FIG. 18 illustrates a screen transition in a case where upon an authentication error occurs when information inputting by a user, information inputting is once again performed by the user. Reference numeral 1801 denotes a screen (Login.html) on which inputting of information accompanying user authentication is performed. In step S903 of FIG. 9, as a result of the determination, the Web browser monitoring module 407 stores the URL information in a case where a loading completion notification is received from the HTML data of Login.html (URL information). In a case where the user, on the screen 1801, inputs a login ID 1802 and a password 1803 for authentication, presses a login button 1804, and an authentication error occurs, a screen that is displayed is reference numeral 1805 (Error.html). By inputting a login ID 1806 and a password 1807 for authentication and pressing a GUI button 1808 for logging in on the screen 1805, it is possible to perform login processing once again.

FIG. 19 illustrates an example of a script that notifies the Web browser monitoring module 407 that the loading of the HTML data by the Web browser 404 has completed, and that the page is not a target page for storing the user information. FIG. 20 illustrates an example of HTML data of the screen 1805 displayed in a case where the authentication error explained in FIG. 18 occurs. A script tag 2001 is for a script, which is shown in FIG. 19, that notifies the Web browser monitoring module 407 that the loading of the HTML data by the Web browser 404 has completed and that the page is not a page that is a target of storing user information.

When reading in of the screen 1805 has completed, and the loading of the HTML data completes, the Web browser monitoring module 407, in step S1007 of FIG. 10, makes an instruction to the Web browser 404 to load the script. Here, in this embodiment, the Web browser monitoring module 407 makes a notification to the Web browser 404 of the URL information (reference numeral 1801).

<Form Data Storage Processing>

Figure 21:
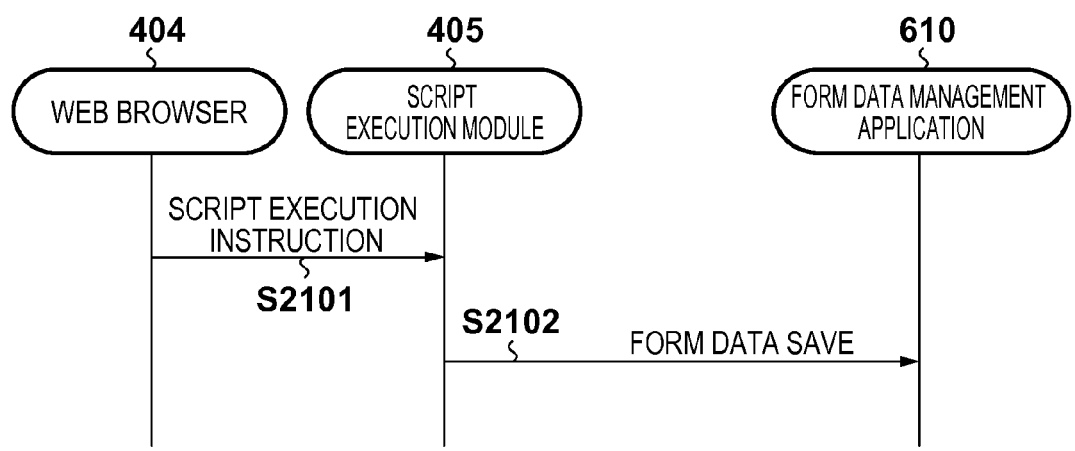
FIG. 21 is a view for illustrating the form data storage processing sequence according to the second embodiment.

Next, with reference to FIG. 21, explanation will be given for form data storage processing performed when a user, in the screen 1805 of the present embodiment, performs information inputting. A sequence shown in FIG. 21 is started when the user presses the GUI button 1808 after inputting the information manually in a state in which the screen shown in the screen 1805 is displayed by the Web browser 404.

In step S2101, the Web browser 404 makes an instruction to the script execution module 405 to execute the script shown in reference numeral 1504 of FIG. 15. In step S2102, the script execution module 405 executes the script of reference numeral 1504, and as a result, the saving of form data is requested of the form data management application 610. Here, it is advantageous that the condition for requesting the saving be the condition that the authentication succeeds for the user information that is re-input (the user name and the password). According to the present embodiment, in the request URL information (reference numeral 1801) stored on the form data management application 610 is included. On the form data management application 610 side, in accordance with the request from the script execution module 405, content of the form data management table 700 is updated.

Also, in this embodiment, an embodiment is taken such that, on top of notifying the Web browser 404 of the URL information hold in the Web browser monitoring module 407, the form data management application 610 is notified of associated the user information and also the URL information (reference numeral 1801). However, in a case where the Web browser monitoring module 407 and the form data management application 610 are the same module, there is no need to notify the form data management application 610 from the Web browser monitoring module 407. In such a case, the form data management application 610 may refer to the URL information (reference numeral 1801) held in the Web browser monitoring module 407.

As explained above, the information processing system according to the embodiment, when an authentication error occurs in a case where authentication processing is performed through the auto-complete function, user input is once again requested, and an authentication is executed in accordance with the inputted user information. Furthermore, when the authenticating succeeds, it is possible to update the content of user information in the form data management table 700 in order that newly inputted user information be used for the auto-complete function the next time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-270127, filed on Dec. 26, 2013, which is hereby incorporated by reference herein in its entirety.

What is claimed is:

1. An information processing apparatus having a Web browser being capable of receiving screen information provided by a Web server, and displaying an input screen for inputting authentication information based on the screen information, the apparatus comprising:
   an execution unit configured to execute a script;
   a holding unit configured to hold a first script for acquiring authentication information stored in an external apparatus;
   an acquisition unit configured to, in a case where, in the received screen information, a second script is included, cause an execution unit to execute the first script, and as an execution result of the first script, to acquire the authentication information; and
   a display unit configured to display, in a state in which the authentication information acquired by the acquisition unit is set, the input screen,
   wherein the acquisition unit, by causing the execution unit to execute a third script provided from the external apparatus as an execution result of the first script, acquires the authentication information.

2. The information processing apparatus according to claim 1, wherein the acquisition unit, using an ID issued by the external apparatus as an execution result of the first script, acquires the authentication information.

3. The information processing apparatus according to claim 1, further comprising a storage unit configured to cause the external apparatus to store authentication information that a user inputted into the information processing apparatus,
   wherein the authentication information that the acquisition unit acquired is the authentication information stored in the storage unit.

4. The information processing apparatus according to claim 1, further comprising:
   a reading unit configured to read an image on an original; and
   a printing unit configured to print an image onto a sheet.

5. An information processing system including a Web server, and an information processing apparatus having a Web browser being capable of receiving screen information provided by the Web server, and displaying an input screen for inputting authentication information based on the screen information, wherein
   the Web server
      comprises a provision unit configured to provide screen information including a second script and screen information that does not include the second script to the information processing apparatus, and
   the information processing apparatus comprises:
      an execution unit configured to execute a script;
      a holding unit configured to hold a first script for acquiring authentication information stored in an external apparatus;
      a control unit configured to cause the execution unit to execute the first script, which is held by the holding unit;
      a notification unit configured to, in a case where the received screen information includes a second script, cause the execution unit to execute the second script, and as an execution result of the second script, to make a notification to the control unit;
      an acquisition unit configured to acquire, as a result of the control unit, which received the notification by the notification unit, causing the execution unit to execute the first script, the authentication information; and
      a display unit configured to display, in a state in which the authentication information acquired by the acquisition unit is set, the input screen.

6. A method of controlling an information processing apparatus having a Web browser being capable of receiving screen information provided by a Web server, and displaying an input screen for inputting authentication information based on the screen information, the method comprising:
   executing a script;
   holding a first script for acquiring authentication information stored in an external apparatus;
   in a case where, in the received screen information, a second script is included, acquiring, as a result of causing an execution of the first script in the executing, the authentication information; and
   displaying, in a state in which the acquired authentication information is set, the input screen,
   wherein the authentication information is acquired by causing an execution of a third script provided from the external apparatus as an execution result of the first script.

7. A non-transitory computer-readable storage medium storing a program for causing a computer to perform a method of controlling an information processing apparatus having a Web browser being capable of receiving screen information provided by a Web server, and displaying an input screen for inputting authentication information based on the screen information, the method comprising:
   executing a script;
   holding of a first script for acquiring authentication information stored in an external apparatus;
   in a case where, in the received screen information, a second script is included, acquiring, as a result of causing an execution of the first script in the executing, the authentication information; and
   displaying, in a state in which the acquired authentication information is set, the input screen;
   wherein the authentication information is acquired by causing execution of a third script provided from the external apparatus as an execution result of the first script.

* * * * *